United States Patent [19]

Yves

[11] Patent Number: 5,752,544
[45] Date of Patent: May 19, 1998

[54] DEVICE FOR FEEDING A DISTRIBUTION NETWORK WITH GASEOUS FLUID

[75] Inventor: Fourmont Yves, Villabe, France

[73] Assignee: Gaz de France, Paris, France

[21] Appl. No.: 758,510

[22] Filed: Dec. 2, 1996

[30] Foreign Application Priority Data

Dec. 1, 1995 [FR] France .................................. 95 14215

[51] Int. Cl.$^6$ .................................................. F16K 17/00
[52] U.S. Cl. ........................... 137/461; 137/488; 137/462
[58] Field of Search .............................. 137/461 I, 488, 137/456, 613, 462

[56] References Cited

U.S. PATENT DOCUMENTS

| 2,426,212 | 8/1947 | Hedene ............................ 137/488 |
| 2,676,611 | 4/1954 | Page ................................ 137/488 |
| 2,707,483 | 5/1955 | Shafer .............................. 137/488 |
| 3,009,479 | 11/1961 | Flanders et al. . |
| 5,240,034 | 8/1993 | Cornil ............................. 137/461 |

FOREIGN PATENT DOCUMENTS

| 1 308 119 | 2/1963 | France . |
| 2 204 777 | 5/1974 | France . |
| 2 392 304 | 12/1978 | France . |
| 2 573 840 | 5/1986 | France . |

*Primary Examiner*—Denise L. Ferensic
*Assistant Examiner*—Ramyar Farid
*Attorney, Agent, or Firm*—McDermott, Will & Emery

[57] ABSTRACT

Each gas expansion station of a distribution network fed with gas in accordance with the invention comprises at least one regulator-expander provided with a valve member disposed on a main duct, a pilot valve, a safety valve provided with a valve member disposed in the main duct, and a differential member co-operating with the pilot valve and the safety valve which is disposed upstream from the regulator-expander to close the safety valve automatically under the control of the pilot valve in the event of the downstream pressure in the main duct downstream from the expansion station concerned exceeding a predetermined threshold value, and to operate automatically, after the downstream pressure has been restored to below the predetermined threshold value, either to reopen the safety valve if the regulator-expander of the expansion station concerned is not itself giving rise to a leak at its valve member, or else to keep the safety valve closed if the regulator-expander is not itself providing gastight sealing at its valve member.

9 Claims, 7 Drawing Sheets

DEVICE FOR FEEDING A DISTRIBUTION NETWORK WITH GASEOUS FLUID

The present invention relates to a device for feeding gaseous fluid to a distribution network including a set of gas expansion stations, each expansion station comprising at least one regulator-expander fitted with a valve member disposed on a main duct, a pilot valve, and a safety valve provided with a valve member disposed on said main duct.

BACKGROUND OF THE INVENTION

In any gas distribution network, it is necessary to provide the downstream network with protection against downstream pressure that is too low or too high. Under normal operating conditions, downstream pressure at the outlet from an expansion station is regulated by a regulator-expander which constitutes the essential component of said expansion station, the regulator-expander itself being associated with a pilot valve that is responsive to downstream pressure and that is capable of causing a safety valve disposed in the expansion station to close in order to interrupt the feed to the downstream network in the event of downstream pressure being too high, or on the contrary in the event of downstream pressure being too low.

Various types of expansion station are already known in which a mechanical safety valve closes automatically in the event of anomalous downstream pressure. However, since a distribution network includes a large number of expansion stations, when one station fails, it frequently happens that downstream pressure which is too high causes the safety valves in a plurality of expansion stations to close in cascade, even though the regulator-expander of only one expansion station is faulty. It is then necessary to verify all of the expansion stations and to re-engage the various safety valves manually after the defective expansion station has been identified and repaired.

Devices also exist for protecting meshed gas distribution networks that enable the expansion station in which a regulator-expander is defective to be identified. However, in that case, the protection device is specific to a particular type of regulator-expander and cannot be installed universally regardless of the structure of the regulator-expander.

Proposals have also been made to associate two regulator-expanders in a single expansion station as a security measure. Nevertheless such complete redundancy gives rise to very high equipment and maintenance costs.

OBJECTS AND SUMMARY OF THE INVENTION

The present invention seeks to remedy the above-mentioned drawbacks and in particular to make it possible with a low cost universal apparatus that is independent of the particular structure of a regulator-expander and that is installable on all the expansion stations of an existing gas distribution network to guarantee both that the safety valves in the various expansion stations all close automatically in conventional manner in the event of abnormal conditions of excess pressure appearing downstream from said expansion stations, and that the genuinely defective expansion station is identified, thereby avoiding the need to take manual action on all of the expansion stations that have responded to abnormal downstream pressure conditions.

These objects are achieved by a device for feeding gaseous fluid to a distribution network including a set of gas expansion stations, each expansion station comprising at least one regulator-expander fitted with a valve member disposed on a main duct, a pilot valve, and a safety valve provided with a valve member disposed on said main duct, wherein each expansion station further comprises a differential member co-operating with the pilot valve and the safety valve which is disposed upstream from the regulator-expander to provide automatic closure of the safety valve under the control of the pilot valve when the downstream pressure in the main duct downstream from the expansion station concerned exceeds a predetermined threshold value, and to operate automatically, after said downstream pressure has been re-established to below said predetermined threshold value, either to reopen said safety valve if the regulator-expander of the expansion station concerned is not itself giving rise to a leak associated with its valve member, or else to keep said safety valve closed if said regulator-expander is not itself providing sealing at its valve member.

More particularly, for each expansion station, the safety valve comprises a valve member secured to a piston defining a first piston chamber connected by a duct to the pilot valve, and the pilot valve is itself connected by a duct to a length of main duct situated downstream from the regulator-expander.

For each expansion station, the differential member is connected via first and second detection ducts firstly to a length of main duct situated upstream from the safety valve and secondly to a length of main duct situated between the safety valve and the regulator-expander, and the differential member is also connected to the pilot valve via a control duct.

For each expansion station, the differential member comprises a valve member for decompression to the atmosphere and connected to said control duct with opening thereof being caused in the event of unbalance between the pressures applied to said first and second detection ducts.

Advantageously, in order to be suitable for implementation in a gas feed network having different pressures, for each expansion station, the differential member is connected to the pilot valve via a pre-expander.

In a first possible embodiment, for each expansion chamber, the safety valve comprises a spring for closing the valve member, and the piston of the safety valve is actuated pneumatically in the opening direction by the pilot valve by admitting pressure into said first chamber defined by the piston and in opposition to the force exerted by said spring.

In a second possible embodiment, for each expansion station, the piston of the safety valve is actuated pneumatically both for opening and for closing from the pilot valve by admitting into first and second chambers situated on either side of the piston of the safety valve respectively pressure coming from the differential member and the downstream pressure in the length of main duct situated downstream from the regulator-expander.

Whatever the embodiment envisaged, for each safety station:

a) when the downstream pressure in the length of main duct situated downstream from the regulator-expander is less than said threshold value, and if the regulator-expander of the expansion station concerned is not itself giving rise to a leak at its valve member, the pilot valve injects pressure into said first chamber of the safety valve taken from the differential member and greater than said downstream pressure;

b) when said downstream pressure is greater than said threshold value, the pilot valve injects said downstream pressure into said first chamber of the safety valve; and c) when the downstream pressure is less than said threshold value, and if the regulator-expander of the expansion station concerned is suffering from a leak at its valve member, the pilot valve injects pressure into said first chamber of the safety valve taken from the differential member and lower than said downstream pressure.

According to a particular characteristic that makes it possible to take account of possible microleaks due to a pilot valve, and to calibrate tolerance in the operation of a safety valve, for each expansion station, a cock having a calibrated orifice is mounted to bypass the safety valve.

Each expansion station may also be fitted with a pressure gauge making it possible to identify a faulty station by remote detection.

The invention may be applied to a meshed feed network in which feed continuity is re-established by the other expansion stations in the event of a particular expansion station being fault, or to a star feed network fitted with backup lines for re-establishing feed continuity in the event of a particular expansion station being faulty.

BRIEF DESCRIPTION OF THE DRAWINGS

Other characteristics and advantages of the invention appear on reading the following description of particular embodiments given as non-limiting examples with reference to the accompanying drawings, in which.

MORE DETAILED DESCRIPTION

Figure 1:
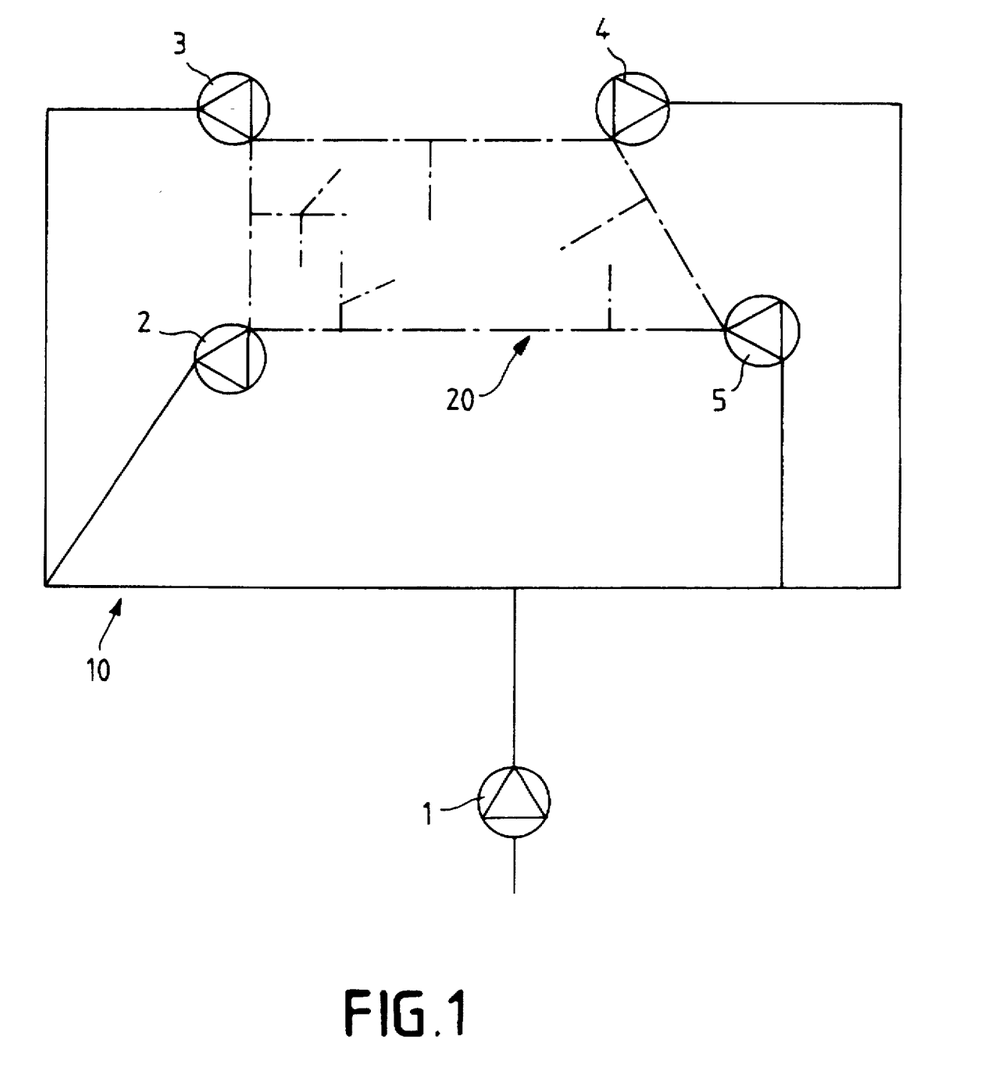
FIG. 1 is a diagrammatic view showing a gas distribution network including a set of expansion stations.

FIG. 1 is a highly diagrammatic representation of a gas distribution network 10, 20 comprising a set of expansion stations 1 to 5 each fitted with a regulator-expander associated with a safety valve. More particularly but in non-limiting manner, in the example of FIG. 1, a main expansion station 1 feeds a primary network 10 with medium pressure, e.g. a pressure of about 16 bars, this primary network 10 comprising various ducts (drawn as solid lines) connecting the main expansion station 1 to secondary expansion stations 2 to 5 which in turn feed a low pressure secondary network 20, e.g. at a pressure of 4 bars. The secondary network 20 (comprising ducts represented by chain-dotted lines in FIG. 1) may itself be a meshed network. i.e. a network in which, in the event of one of the expansion stations being faulty, e.g. expansion station 2, the secondary network 20 must continue to be fed via the other expansion stations 3 to 5 that are not faulty. The secondary network 20 may also be a star network, in which case a backup line is associated with each expansion station 2 to 5 and can be put into operation automatically in the event of a fault in one of the expansion stations, e.g. expansion station 2. Naturally, the main network 10 may similarly include a plurality of expansion stations that are associated within a meshed distribution network or a star network.

When an expansion station, such as the station 2 for example, becomes faulty, e.g. due to a leak past the valve member of the regulator-expander of said expansion station, then excess pressure arises downstream from the expansion station 2 which will lead to the safety valve of the expansion station 2 closing automatically. Nevertheless, the increase in downstream pressure will also give rise initially to an increase in the pressure downstream from other expansion stations, 3, 4, or 5 that are not themselves presenting any defective behavior. The safety valves of those expansion stations 3, 4, or 5 will therefore also close. As explained below with reference to FIGS. 2 to 7, the invention makes it possible for non-defective expansion stations 3 to 5 to re-engage rapidly by rapidly reopening the valve members of the safety valves in said stations, while ensuring that the safety valve of the defective expansion station is kept closed and while identifying said station, this type of operation being made possible regardless of the particular structure of the regulator-expanders which may remain conventional in configuration, providing that re-engagement of the non-defective expansion stations is performed by taking account merely of the way in which the pressure downstream from said expansion stations varies.

Figure 2:
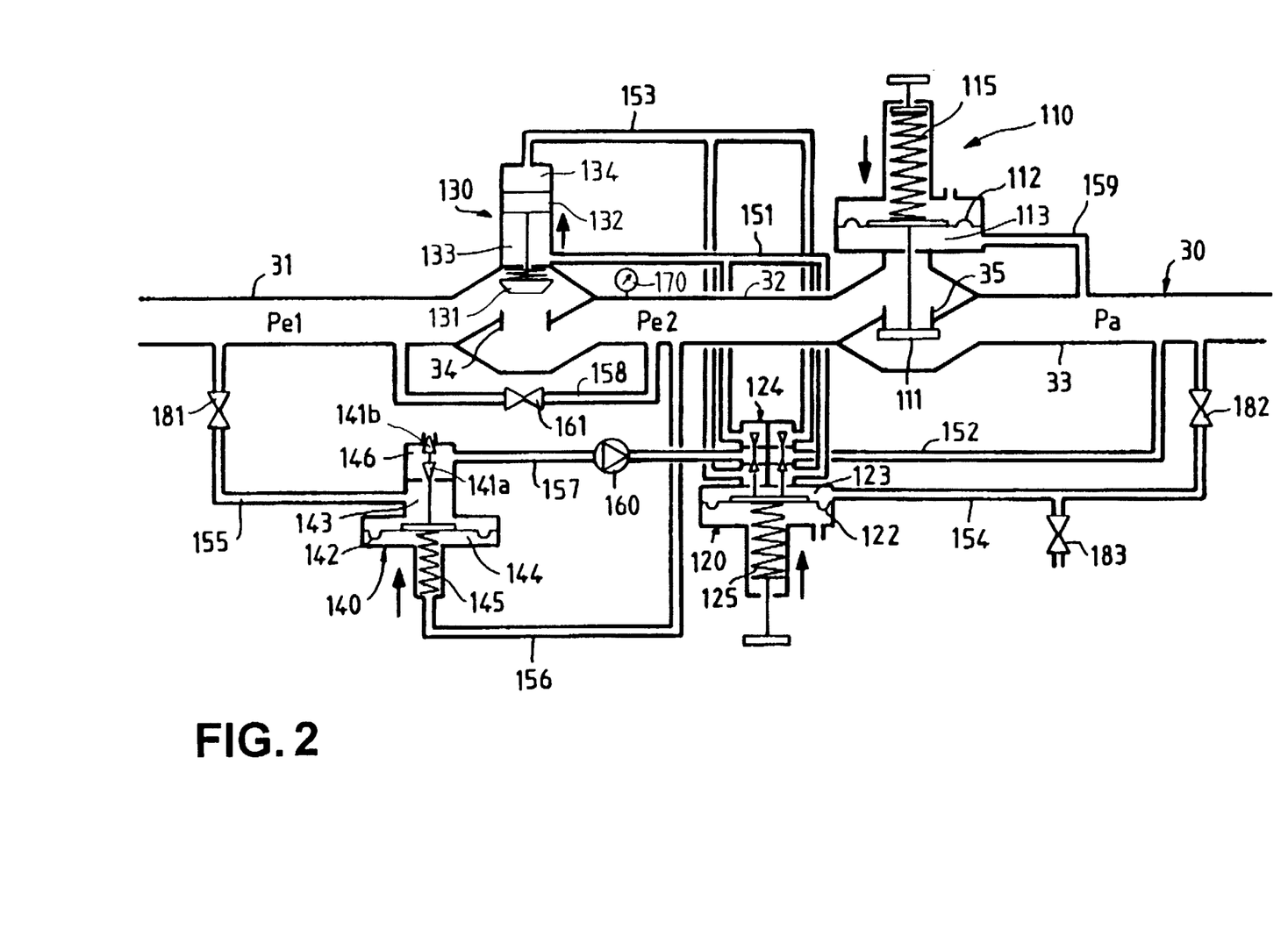
FIG. 2 is a diagrammatic view of an expansion station constituting a first embodiment of the invention and placed in a configuration for normal operation in the absence of a fault or an anomaly concerning pressure level downstream from the expansion station.
Figure 3:
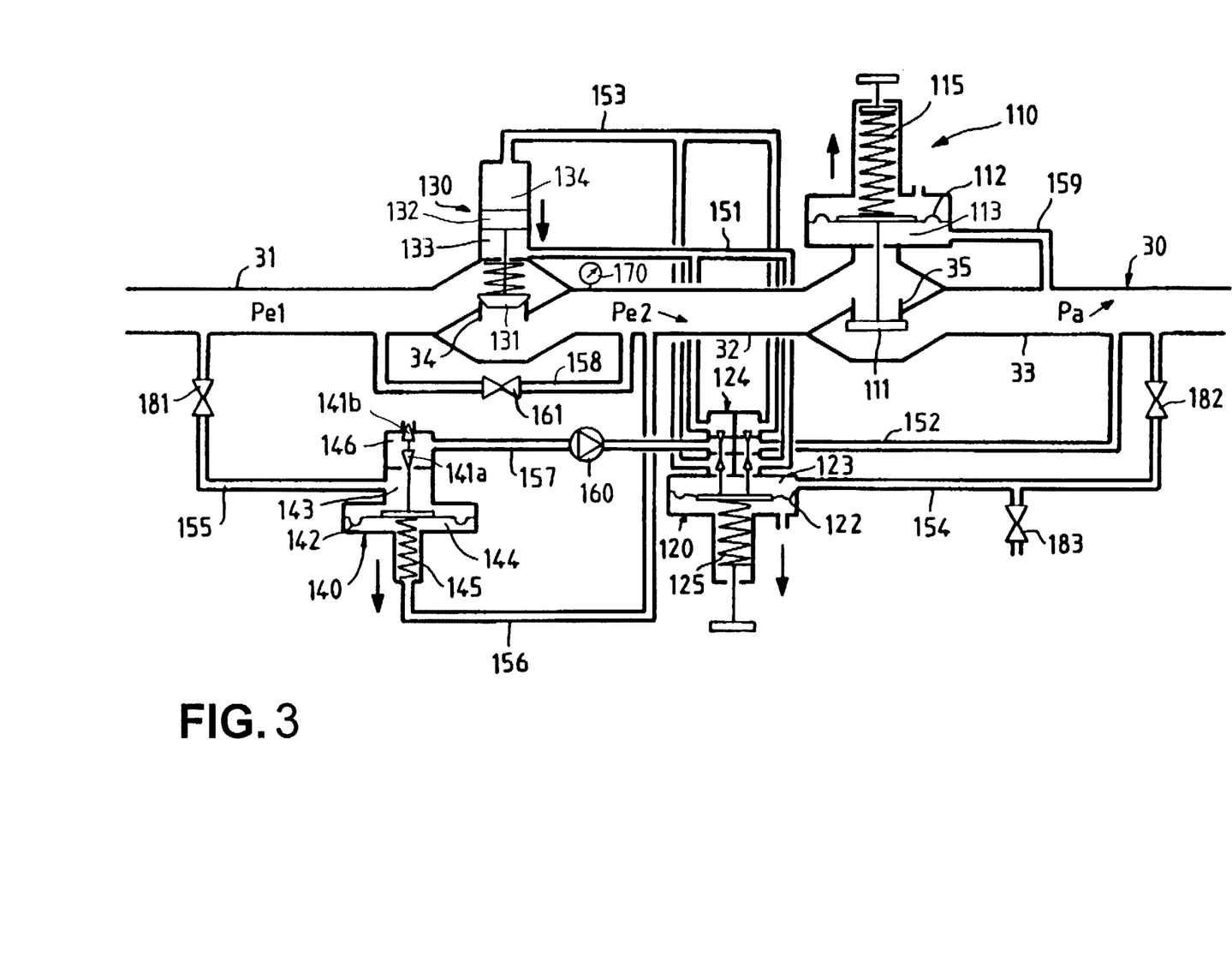
FIG. 3 is a diagrammatic view of the FIG. 2 expansion station, but showing a defect in the regulator-expander of the expansion station leading to an increase in pressure downstream from the expansion station.
Figure 4:
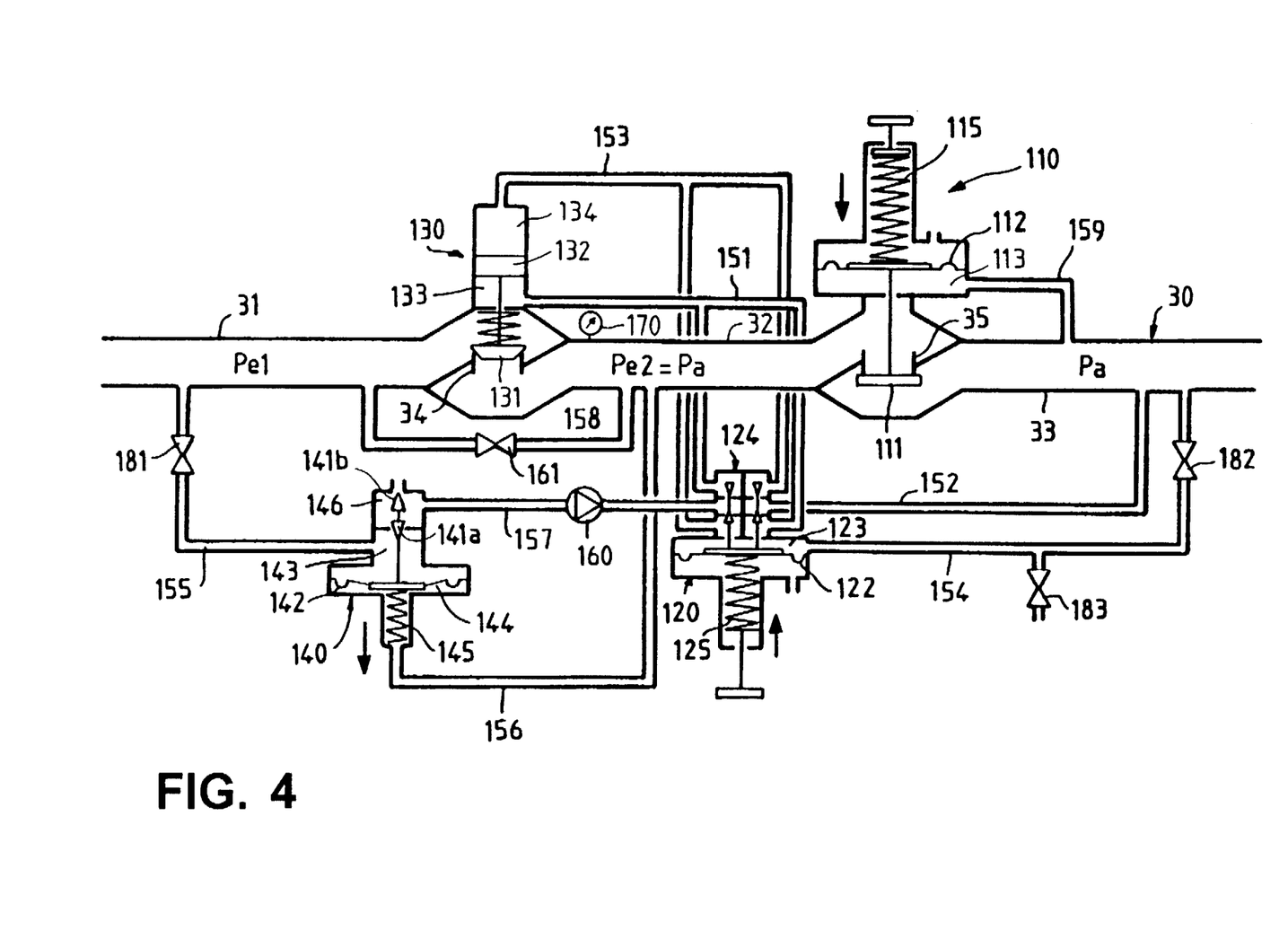
FIG. 4 is a diagrammatic view of the expansion station of FIGS. 2 and 3 after normal pressure has automatically been re-established downstream from the expansion station.

Reference is now made initially to FIGS. 2 to 4. The two essential members of a conventional expansion chamber, namely a safety valve 130 and a regulator-expander 110 are disposed in cascade on a main duct 30. These main members co-operate with a pilot valve 120 and with a differential valve 140. The safety valve 130 includes a valve member 131 which co-operates with a valve seat 34 disposed in the main duct 30. Similarly, the regulator-expander 110 includes a valve member 111 which co-operates with a valve seat 35 disposed in the duct 30 downstream from the valve seat 34. The main duct 30 defines an upstream duct length 31 in which there exists a pressure $Pe_1$ and which is situated upstream from the safety valve 130, an intermediate duct length 32 in which there exists a pressure $Pe_2$ and which is situated between the safety valve 130 and the regulator-expander 110, and a downstream duct length 33 in which there exists a downstream pressure Pa.

The regulator-expander 110 is of conventional configuration having a valve member 111 secured to a membrane 112 which defines a chamber 113 into which gas at the downstream pressure Pa is injected via a duct 159 in communication with the downstream duct length 33. The membrane 112 itself acts against a rated spring 115 mounted to enable the valve member 111 to open to a greater or lesser extent as a function of the way in which the downstream pressure Pa varies, which pressure, in normal operation, is less than the pressures $Pe_1$ and $Pe_2$.

The safety valve 130 itself includes a valve member 131 secured to a piston 132 which defines a bottom chamber 133 and a top chamber 134 on either side of the piston 132. The chambers 133 and 134 are in communication via lines 151 and 153 with the two-track slide valve 124 of the pilot valve 120 which itself includes, in conventional manner, a membrane 122 co-operating with a rated spring 125 and defines a chamber 123 in communication via a line 154 with the downstream duct length 33.

The differential valve 140 includes a membrane 142 defining a first chamber 143 in communication via a line 155 with the upstream duct length 31, and a second chamber 144 in communication via a line 156 with the intermediate duct length 32. The membrane 142 also co-operates with a rated spring 145 and a valve 141 for decompression to the atmosphere which acts to put the third chamber 146 into communication either with the first chamber 143 or with the atmosphere. The third chamber 146 is in communication via a duct 157 with the slide valve 124 of the pilot valve 120. A pre-expander 160 is preferably interposed in the duct 157 so as to enable universal operation of the slide valve 124 of the pilot valve 120 regardless of the upstream pressure level $Pe_1$ (medium or low pressure).

FIG. 2 shows cocks 181 and 182, 183 disposed respectively in the ducts 155 and 154. The cocks 181, 182, and 183 are optional and serve essentially to facilitate setting the device as a whole.

Similarly, reference 170 designates a possible connection point for a pressure gauge serving to monitor, e.g. remotely, variations in the pressure $Pe_2$ in the intermediate length 32 of each expansion station.

The duct 158 branching from the safety valve 130 is fitted with a cock 161 having a calibrated orifice and making it possible, where appropriate, to establish a degree of tolerance in the event of a microleak in the pilot valve 120 giving rise to an anomaly. By means of a controlled permanent small leak through the cock 161, it is possible to calibrate the degree of tolerance and to ignore a defect constituted by said microleak existing at the pilot valve 120. The duct 158 and the cock 161 thus merely constitute an option enabling the installation to operate even with a slightly defective pilot valve 120.

In the operating state shown in FIG. 2, where the downstream pressure Pa in the downstream length 33 does not exceed a predetermined threshold value, the top chamber 134 of the safety valve 130 receives the downstream pressure Pa via the duct 153 which is duplicated at the two-track slide valve 124 of the pilot valve 120 in the open position, while the bottom chamber 133 of the safety valve 130 receives pressure from the duct 157 and the pre-expander 160 derived from the differential valve 140 in the open position, which pressure is conveyed by the duct 151 which is duplicated at the two-track slide valve 124 of the pilot valve 120, which pressure is such that the valve member 131 of the safety valve 130 is in the open position. In this case, the pressure $Pe_2$ in the intermediate duct length 32 is equal to the upstream pressure $Pe_1$ in the upstream duct length 31.

FIG. 3 shows the expansion station of FIG. 2 when the downstream pressure Pa increases greatly in abnormal manner, e.g. because of a lack of sealing around the valve member 111 of the regulator-expander 110. In this case, the pilot valve 120 has changed state, thereby enabling the greater than normal downstream pressure Pa to be injected into the bottom chamber 133 of the safety valve via the slide valve 124 and the duct 151, thereby decompressing said chamber while pressure for closing the valve member 131 of the safety valve is injected into the top chamber 134 thereof from the duct 153, the slide valve 124, and the duct 157.

In the operating step of FIG. 3, the valve member 111 of the regulator-expander 110 tends to be in the closed position against the valve seat 35. The membrane 122 of the pilot valve 120 is itself urged downwards together with the moving assembly of the slide valve 124 which led to the valve member 131 of the safety valve 130 being closed, as mentioned above. Because a defect exists at the valve member 111 of the regulator-expander 110, the pressure $Pe_2$ tends to decrease in the intermediate length 32 which, via the link 156 with the chamber 144 of the differential valve 140, tends to urge the membrane 142 downwards together with the associated moving equipment which comprises a valve member 141a for closing the passage between the chamber 146 and the chamber 143, and a valve member 141b for decompression of the chamber 146 to the atmosphere.

FIG. 4 shows the situation of the expansion station at the end of the process of the step shown in FIG. 3. Because of the leak that exists around the valve member 111 of the regulator-expander 110, the pressure $Pe_2$ in the intermediate duct length 32 has decreased until it has come into equilibrium with the pressure Pa existing downstream from the valve member 111 of the regulator-expander 110.

Variation of the pressure $Pe_2$ in the intermediate length 32 gives rise to unbalance relative to the upstream pressure $Pe_1$ in the upstream length 31, with this unbalance extending on either side of the membrane 142 of the differential valve 140, the chamber 143 remaining at the pressure $Pe_1$ while the chamber 144 sees its pressure $Pe_2$ drop to the valve of the downstream pressure Pa. The moving equipment of the differential valve 140 is then urged downwards, thereby closing the valve member 141a, preventing communication between the chambers 143 and 146, and opening the valve member 141b which puts the top chamber 146 into communication with the atmosphere. As a result, the duct 157 no longer enables a control pressure to be applied to the slide valve 124 of the pilot valve 120 such that the pilot valve 120 can no longer control the safety valve 130.

The expansion station of FIG. 4 is thus completely isolated since the safety valve 130 remains closed. The downstream pressure Pa of the network downstream from the regulator-expander 110 returns to normal as soon as service is ensured either by a backup line for a star network or by some other non-faulty station for a mesh network. It is possible to detect which expansion station is faulty remotely, e.g. by means of information from a pressure gauge 170 disposed on the intermediate duct length 32.

For expansion stations of the same network that are fitted with the above-described device but that possess regulator-expanders that are not faulty, the step of FIG. 3 is initiated, i.e. the servo-control of the downstream pressure Pa in the downstream length 33 caused by the faulty operation of the regulator-expander 110 of one of the expansion stations associated with the same network gives rise likewise to automatic closure of the valve member of the safety valve 130, with the pilot valve 120 performing the same role as when the increase in downstream pressure Pa is due to a fault in the regulator-expander 110 of the same station. In contrast, so long as an expansion station includes a regulator-expander that does not have a defect, no leakage takes place around the valve member 111 of the regulator-expander 110, so the pressure $Pe_2$ in the duct length 32 remains equal to the upstream pressure $Pe_1$. The differential valve 140 then remains in the open position of FIGS. 2 and 3 and does not enable the valve member 141a to close, nor does it enable the valve member 141b for decompression to the atmosphere to open. Under such circumstances, a control pressure is maintained in the duct 157 and, via the pre-expander 160, it can feed the slide valve 124 of the pilot valve 120, and as soon as normal downstream pressure Pa has been established, i.e. a pressure that is below a predetermined pressure threshold, the pilot valve 120 can cause the valve member 131 of the safety valve 130 to reopen automatically and return the expansion station to its normal regulating configuration as shown in FIG. 2.

The device of the present invention thus enables defect-free expansion stations to be re-engaged automatically after their safety valves have been closed because of temporary excess pressure downstream therefrom, while guaranteeing that a faulty expansion station remains out of service and keeps its safety valve in the closed position so long as said expansion station continues to have a faulty regulator-expander.

Figure 5:
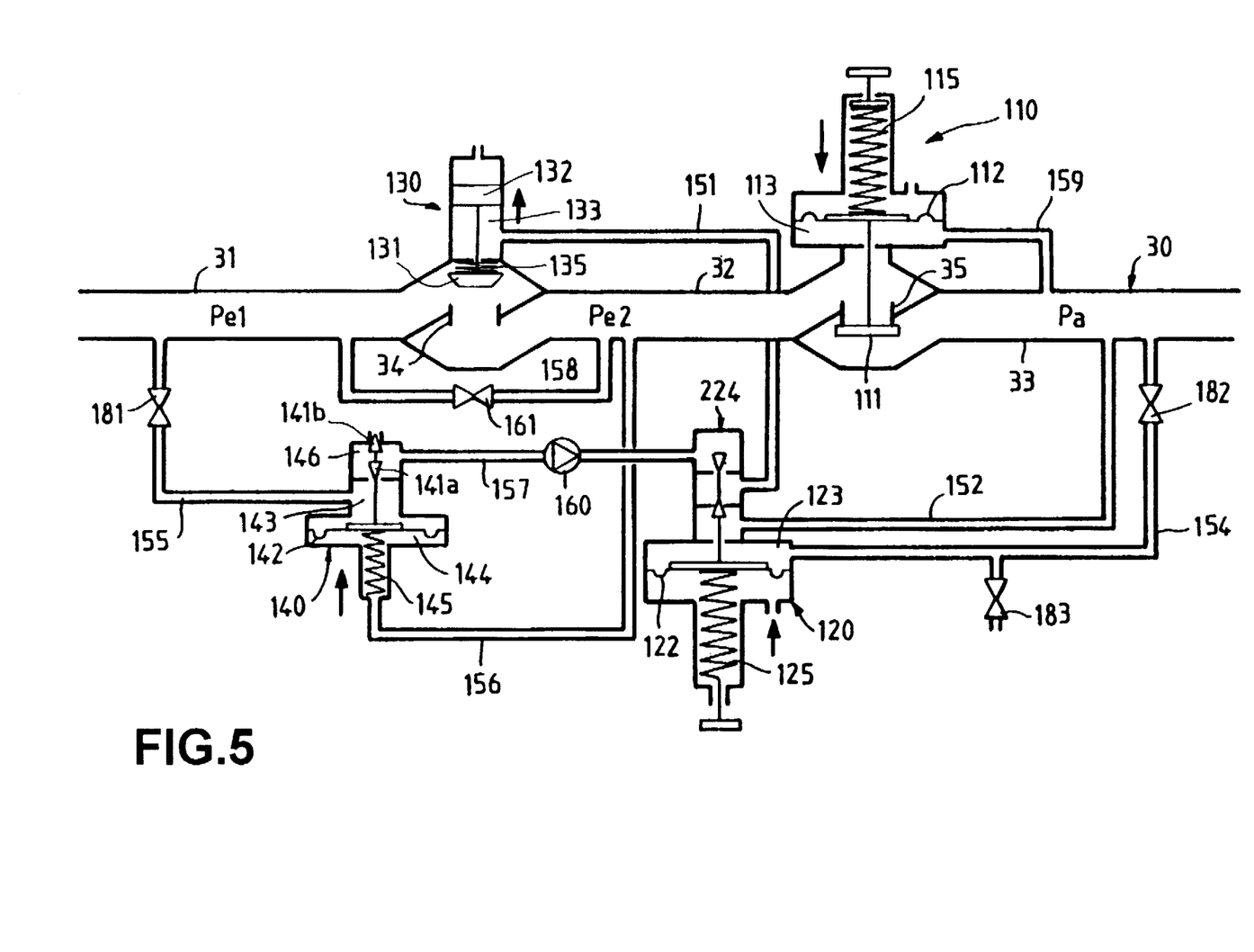
FIG. 5 is a diagrammatic view of an expansion station constituting a second embodiment and placed in a normal operating configuration in the absence of any defect or anomaly in the pressure downstream from the expansion station.
Figure 6:
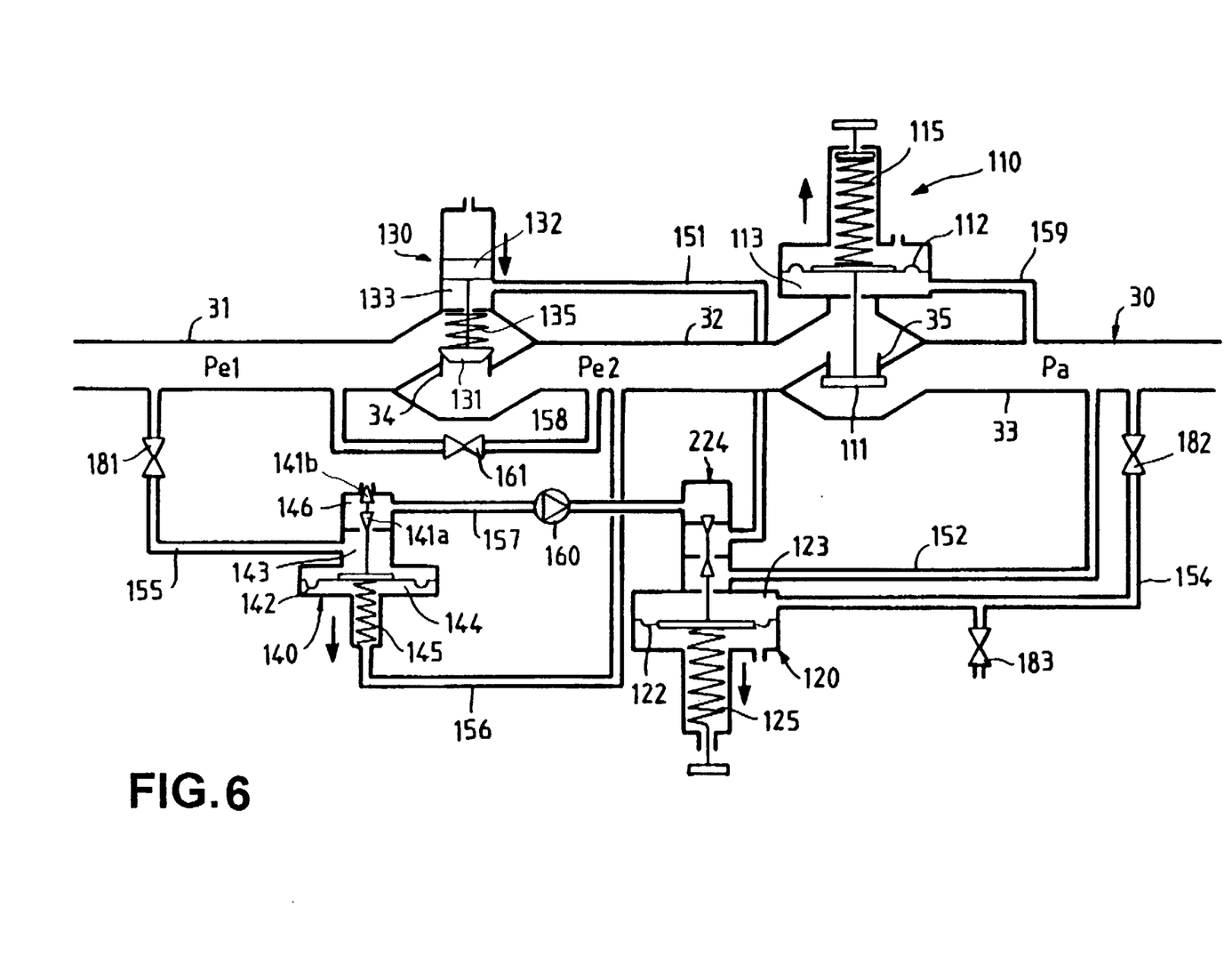
FIG. 6 is a diagrammatic view of the expansion station of FIG. 5, but showing a defect in the regulator-expander of the expansion station leading to an increase in pressure downstream from the expansion station.
Figure 7:
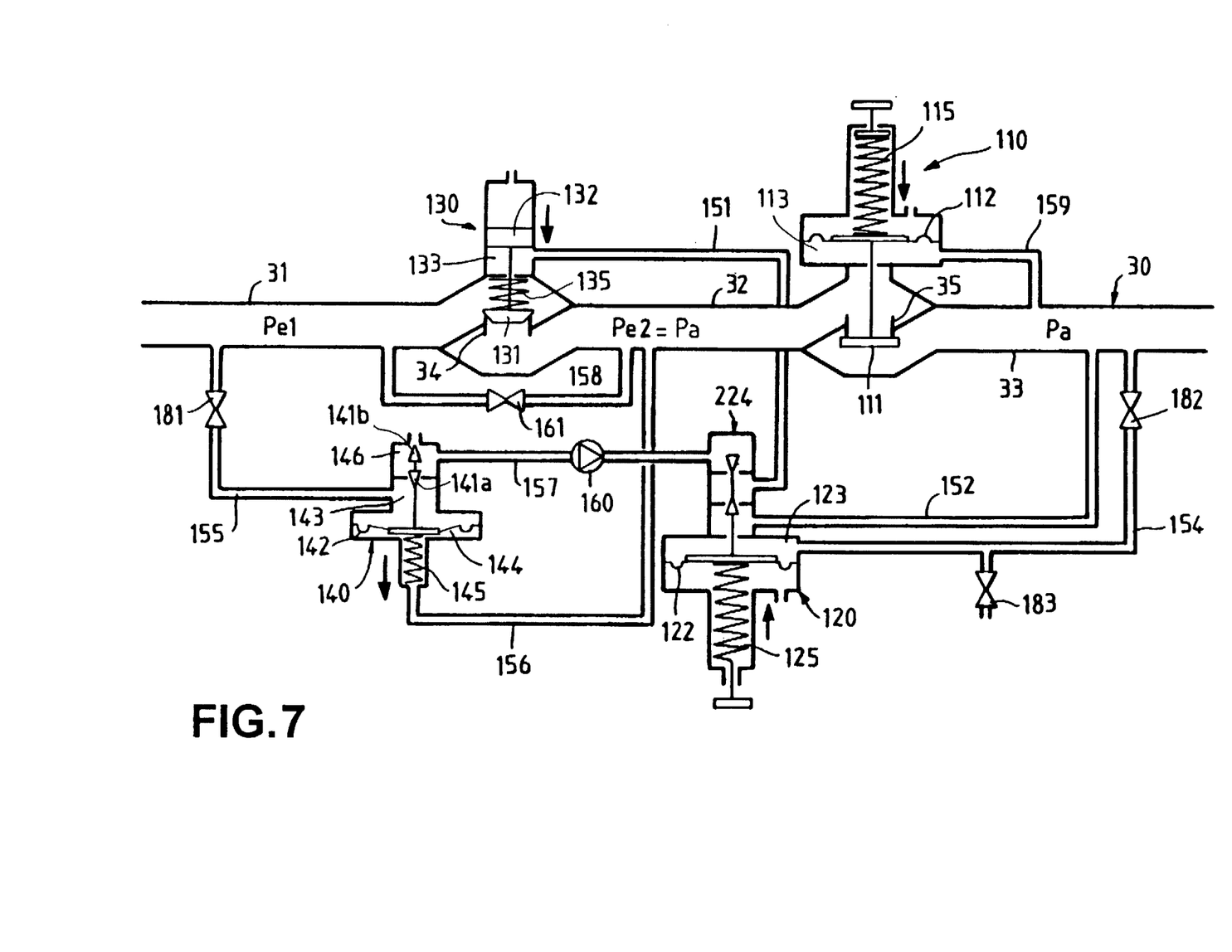
FIG. 7 is a diagrammatic view of the expansion station of FIGS. 5 and 6 after normal pressure has automatically been re-established in the network downstream from the expansion station.

FIGS. 5 to 7 show another possible embodiment of the invention which is similar to that of FIGS. 2 to 4 but in which the safety valve 130 is not controlled to open and close pneumatically by means of the pilot valve 120 as in FIGS. 2 to 4. The numerous elements which are common to both embodiments are not described again, and they are given the same reference numerals.

The essential difference of the embodiment of FIGS. 5 to 7 compared with the embodiment of FIGS. 2 to 4 lies in the fact that the valve member 131 of the safety valve 130 is actuated pneumatically only for opening purposes. In contrast, this valve member 131 is no longer closed pneumatically, but is closed by means of a spring 135 which acts on its moving equipment in a manner equivalent to the pressure previously applied to the piston 132 in the top chamber 134 of the embodiment of FIGS. 2 to 4. In the embodiment of FIGS. 5 to 7, the slide valve 224 of the pilot valve 120 can be simplified since it is now connected only to the downstream length 33 of the main duct by the duct 152, to the bottom chamber 133 of the safety valve by the single duct 151, and to the differential valve 140 by the duct 157 of the pre-expander 160.

FIGS. 5 to 7 correspond to operating steps that are respectively similar to the operating steps of FIGS. 2 to 4.

In FIG. 5, the valve member 131 of the safety valve is opened by admitting pressure into the chamber 133, said pressure being obtained from the upstream pressure $Pe_1$ via the differential valve 140, the duct 157, the optional pre-expander 160, the slide valve 224 of the pilot valve 120, and the duct 151. The pressure in the chamber 133 of the safety valve 130 acts against the force exerted by the spring 135.

Under normal conditions (FIG. 5) the pressure in the chamber 133 situated beneath the piston 132 remains constant. In the event of excess pressure in the downstream network (FIG. 6), the state of the slide valve 224 of the pilot valve 120 changes and the pressure drops in the chamber 133, the downstream pressure Pa replacing the pressure obtained from the upstream pressure $Pe_1$. As in the embodiment of FIGS. 2 to 4, if the regulator-expander 110 of the station under consideration does not have a defect, then the pilot valve 120 continues to be fed with pressure derived from the upstream pressure $Pe_1$ by the differential valve 140, and the safety valve 130 can be re-engaged automatically as soon as a normal downstream pressure Pa is re-established in the downstream duct length 33, thereby enabling the device to return to the configuration of FIG. 5. In contrast, when the regulator-expander 110 of the station in question is faulty, i.e. not leakproof, the pressure $Pe_2$ in the intermediate duct length 32 drops down to the value of the downstream pressure Pa, thereby changing the state of the differential valve 140 which, by decompressing to the atmosphere via valve member 141b, releases the pilot valve 120 which can no longer reopen the valve member 131 so long as the regulator-expander 110 remains faulty (configuration of FIG. 7).

It will be observed in the diagrams of FIGS. 2 to 7 that the differential valve 140 and the pilot valve 120 are shown as being separate apparatuses in order to make operation easier to understand and in order to distinguish the various functions. These two apparatuses, the differential valve 140 and the pilot valve 120 can, where appropriate, be combined in a single structural assembly, so long as the above-described functions continue to be performed. Similarly, the safety valve 130 may be replaced by a combination of a cock disposed upstream from the expansion station and an actuator controlled by the pilot valve 120. It will also be observed that it is possible to provide the safety valve 130 with a pneumatic device for admitting or exhausting gas and suitable for being controlled manually so as to make it possible to close said valve manually.

In general, the device of the invention makes it possible to automate expansion blocks so as to guarantee continuity of gas feed to networks after devices have been triggered in cascade due to a rise in pressure caused by a defective regulator-expander. The device makes rapid and reliable diagnosis possible concerning which regulator-expander is faulty since after a few instants only the safety valve associated with the faulty regulator-expander will still be in the closed position, given that all of the other expansion stations of the same network (and fitted with the same device) will have been re-engaged automatically.

I claim:

1. A device for feeding gaseous fluid to a distribution network including a set of gas expansion stations, wherein each expansion station comprises at least one regulator-expander fitted with a valve member disposed on a main duct, a safety valve provided with a valve member which is disposed on said main duct upstream from the regulator-expander, a pilot valve which is connected by a duct to a length of main duct situated downstream from the regulator-expander and a differential member which is connected via first and second detection ducts firstly to a length of main duct situated upstream from the safety valve and secondly to a length of main duct situated between the safety valve and the regulator-expander, wherein, for each expansion station, the safety valve comprises a valve member secured to a piston defining a first piston chamber connected by a duct to the pilot valve, the differential member is also connected to the pilot valve via a control duct and the differential member comprises a valve member for decompression to the atmosphere and connected to said control duct with opening thereof being caused in the event of unbalance between the pressures applied to said first and second detection ducts, whereby automatic closure of the safety valve is provided under the control of the pilot valve when the downstream pressure in the main duct downstream from the expansion station concerned exceeds a predetermined threshold value and automatic operation of the safety valve is provided, after said downstream pressure has been re-established to below said predetermined threshold value, either to reopen said safety valve if the regulator-expander of the expansion station concerned is not itself giving rise to a leak associated with its valve member, or else to keep said safety valve closed if said regulator-expander is not itself providing sealing at its valve member.

2. A device according to claim 1, wherein, for each expansion station, the safety valve comprises a spring for closing the valve member, and wherein the piston of the safety valve is actuated pneumatically in the opening direction by the pilot valve by admitting pressure into said first piston chamber defined by the piston and in opposition to the force exerted by said spring.

3. A device according to claim 1, wherein, for each expansion station, the piston of the safety valve is actuated pneumatically both for opening and for closing from the pilot valve by admitting into first and second chambers situated on either side of the piston of the safety valve respectively pressure coming from the differential member and the downstream pressure in the length of main duct situated downstream from the regulator-expander.

4. A device according to claim 1, wherein, for each expansion station, the pilot valve and the differential member are calibrated in such a manner that:

a) when the downstream pressure in the length of main duct situated downstream from the regulator-expander is less than said threshold value and, if the regulator-expander of the expansion station concerned is not itself giving rise to a leak at its valve member, the pilot valve injects pressure into said first piston chamber of the safety valve taken from the differential member and greater than said downstream pressure;

b) when said downstream pressure is greater than said threshold value, the pilot valve injects said downstream pressure into said first chamber of the safety valve; and c) when the downstream pressure is less than said threshold value and, if the regulator-expander of the expansion station concerned is suffering from a leak at its valve member, the pilot valve injects pressure into said first chamber of the safety valve taken from the differential member and lower than said downstream pressure.

5. A device according to claim 1, wherein, for each expansion station, the differential member is connected to the pilot valve via a pre-expander.

6. A device according to claim 1, wherein, for each expansion station, a cock having a calibrated orifice is mounted to bypass the safety valve.

7. A device according to claim 1, wherein, each expansion station is fitted with a pressure gauge making it possible to identify a faulty station by remote detection.

8. A device according to claim 1, applied to a meshed feed network in which feed continuity is re-established by the other expansion stations in the event of a particular expansion station being faulty.

9. A device according to claim 1, applied to a star feed network fitted with backup lines for re-establishing feed continuity in the event of a particular expansion station being faulty.

* * * * *